United States Patent
Krus

(10) Patent No.: US 9,763,541 B2
(45) Date of Patent: Sep. 19, 2017

(54) PUSH-PULL GRIND ADJUSTMENT MECHANISM AND MILLS COMPRISING THE SAME

(71) Applicant: Chef'n Corporation, Seattle, WA (US)

(72) Inventor: Matthew Krus, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 367 days.

(21) Appl. No.: 14/657,873

(22) Filed: Mar. 13, 2015

(65) Prior Publication Data

US 2015/0257598 A1   Sep. 17, 2015

Related U.S. Application Data

(60) Provisional application No. 61/952,509, filed on Mar. 13, 2014.

(51) Int. Cl.
*A47J 42/08* (2006.01)
*A47J 42/04* (2006.01)

(52) U.S. Cl.
CPC ............. *A47J 42/08* (2013.01); *A47J 42/04* (2013.01)

(58) Field of Classification Search
CPC ................................. A47J 42/08; A47J 42/04
USPC ..................................................... 241/169.1
See application file for complete search history.

(56) References Cited

U.S. PATENT DOCUMENTS

| | | | |
|---|---|---|---|
| 5,897,067 A * | 4/1999 | Tardif | A47J 42/08 241/169.1 |
| 2008/0185465 A1 | 8/2008 | Pai | |
| 2009/0078807 A1* | 3/2009 | Tang | A47J 42/08 241/169.1 |
| 2011/0162538 A1* | 7/2011 | Wu | A47J 42/08 99/537 |
| 2013/0015279 A1* | 1/2013 | So | A47J 42/46 241/169.1 |
| 2013/0153698 A1* | 6/2013 | Zhang | A47J 42/06 241/100 |

FOREIGN PATENT DOCUMENTS

| | | | |
|---|---|---|---|
| FR | 2 917 589 A1 | 12/2008 | |
| JP | 62-93936 U | 6/1987 | |

* cited by examiner

*Primary Examiner* — Mark Rosenbaum
(74) *Attorney, Agent, or Firm* — Seed IP Law Group LLP

(57) ABSTRACT

The present disclosure is also directed towards systems and methods for grinding a spice or grain material wherein a mill is comprised of a turn knob, a mill body, and a grind assembly and the turn knob is rotatably and slideably coupled to the mill body and sliding the turn knob relative to the mill body adjusts a grind setting of the mill and rotating the turn knob relative to the mill body grinds or mills the spice or grain material.

17 Claims, 8 Drawing Sheets

PUSH-PULL GRIND ADJUSTMENT MECHANISM AND MILLS COMPRISING THE SAME

BACKGROUND

Technical Field

This disclosure generally relates to grinding mechanisms, and more particularly to grinders or mills with adjustable grinding mechanisms for grinding materials, such as spices and grains.

Description of the Related Art

Traditional spice and grain mills are common household and kitchen tools. They typically comprise a hollow cylindrical body with a grinding rasp and rasp ring at one end and a grind knob at the other. A grinder shaft typically runs along the central axis of the body and connects the rasp and knob together such that a user may hold the body and turn the knob, causing the rasp to rotate relative to the rasp ring and grind the material contained within the body. Most mills also provide a means for adjusting the grind coarseness between fine and coarse settings.

The means for adjusting the grind is usually an additional knob threaded onto an extreme end of the grinder shaft, either at the top, above the grind knob, or at the bottom, below the grinding rasp. In either case, to adjust the grind setting, a user must adjust their hold on the grinder, reposition their hands to grab the grind adjustment knob, and then tighten or loosen the knob to adjust the grind. Once they have adjusted the grind they must reposition their hands again before they resume grinding. If the grind needs additional adjustment, then the user must interrupt the grinding process again, reposition their hands, and make further adjustments with the grind adjustment knob. This traditional method for adjusting the grind coarseness is awkward and time consuming.

It is desirable to have a mill that allows for a simple, easy, and straightforward grind adjustment. Further, it is desirable to have a mill with a grind adjustment mechanism that does not require the user to reposition their hands to change the grind setting.

BRIEF SUMMARY

The present disclosure is directed to systems and methods for grinding spices and grains. One system is directed towards a mill that includes a push-pull grind adjustment mechanism.

The present disclosure is also directed towards systems and devices for grinding a spice or grain material. One system includes a mill with a body and a grinder ring coupled to the body and having a ring grinding surface. The mill can include a grind control assembly coupled to a grind shaft and including an input member and a turn knob having an axis of rotation and being rotatably coupled to the body about the axis of rotation and slideably coupled to the grind control assembly via the input member for translation along a longitudinal axis. The mill can also include a rasp having a rasp grinding surface and being coupled at an end of the grind shaft. The rasp may be operatively positionable between at least a first and a second position. In the first position the rasp grinding surface is spaced a first distance from the ring grinding surface; and in the second position, the rasp grinding surface is spaced a second distance from the ring grinding surface. Rotation of the turn knob relative to the body causes rotation of the rasp relative to the grinder ring; and axial translation of the turn knob causes axial translation of the rasp relative to the grinder ring between at least the first and the second position.

The present disclosure is also directed towards systems and devices for controlling the grind of a mill including a case, an input member slidably coupled to the case, a shaft, and a shaft coupler coupling the input member to the shaft such that substantially linear translation of the input member parallel to the shaft induces substantially linear translation of the shaft to adjust a grind coarseness of a mill.

The present disclosure is also directed towards a method for grinding a spice or grain material where a mill comprised of a turn knob, a mill body, and a grind assembly is provided and the turn knob is rotatably and slideably coupled to the mill body. Sliding the turn knob relative to the mill body adjusts a grind setting of the mill while rotating the turn knob relative to the mill body grinds or mills the spice or grain material.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with mills and grinding mechanisms have not been shown or described in detail to avoid unnecessarily obscuring descriptions of the embodiment of the invention.

Figure 1:
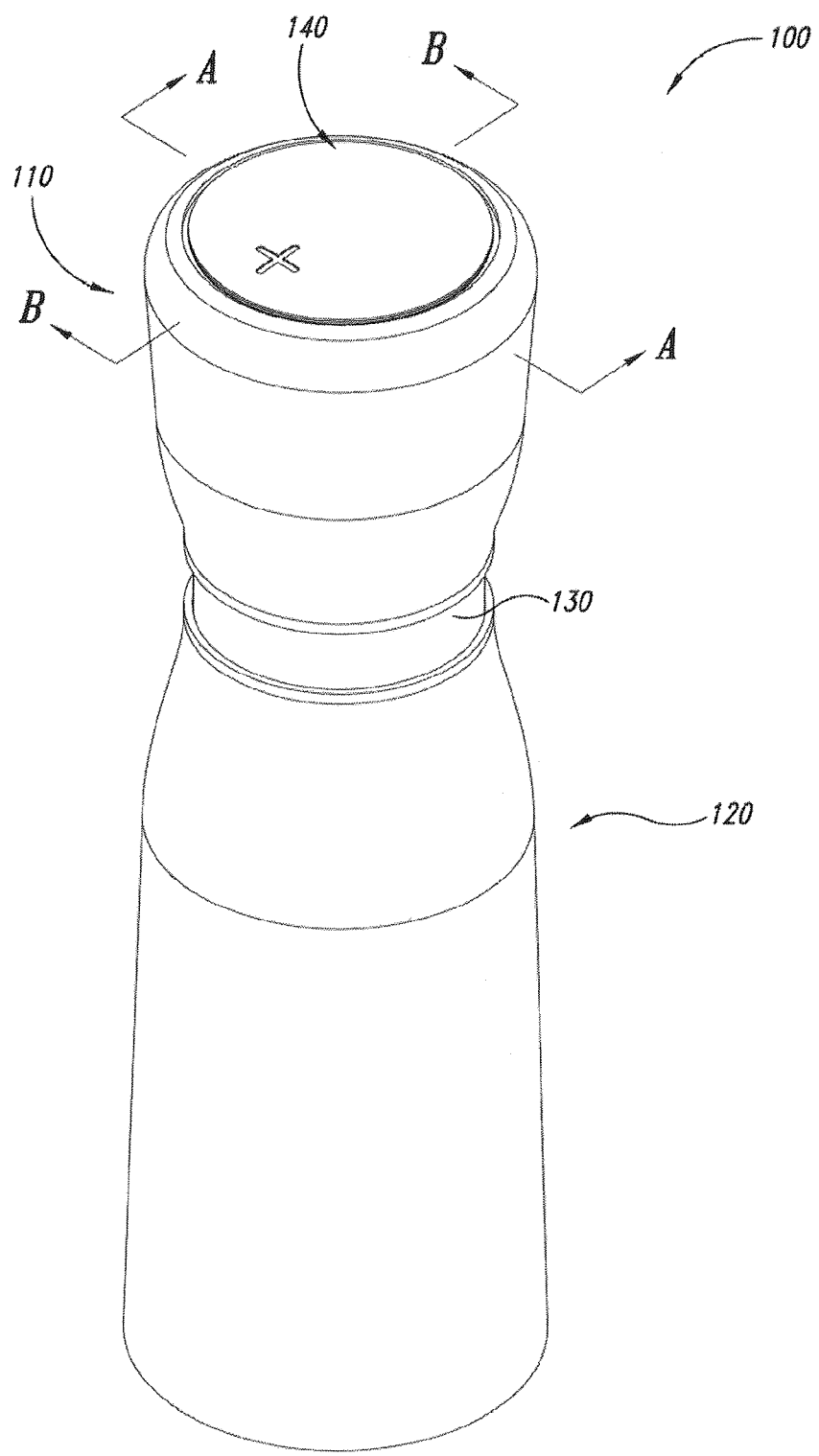
FIG. 1 is a side, top isometric view of a mill for grinding material such as spices and grain.

FIG. 1 shows a grinder or mill 100 for grinding a material such as spices or grains. The mill 100 includes an exterior body 120 and a turn knob 110 coupled to each other. The body 120 and turn knob 110 may be rotatably coupled to each other and rotate about an axis of rotation relative to each other when grinding material. The turn knob 110 may also be coupled to the exterior body 120 such that it may translate along a longitudinal axis of the mill 100 to adjust the coarseness of the ground material; see, for example, longitudinal axis 'X' in FIGS. 5, 6, and 7. In some embodiments, the axis of rotation and the longitudinal axis are coincident with each other. In some embodiments, the longitudinal axis and axis of rotation are not coincident with each other.

Figure 2:
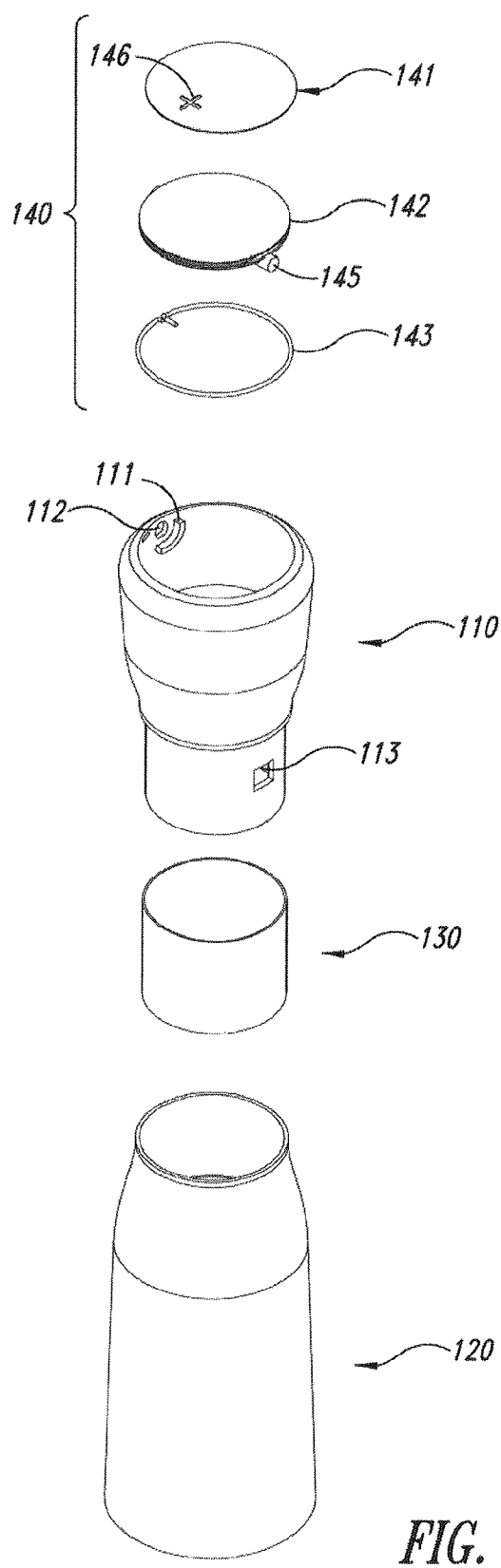
FIG. 2 is an exploded view of the external structure of the mill of FIG. 1.

FIG. 2 shows an exploded view of the main exterior parts of the mill 100, including the cap assembly 140, the turn knob 110, an accent ring 130, and the exterior body 120. The cap assembly 140 may include a cap clad 141, a cap 142, and a cap gasket 143. The illustrated cap clad 141 provides an indicator 146. In some embodiments the cap clad 141 may include the word "salt" or "pepper" to indicate the contents of the mill or a "+" as shown in FIG. 2 to indicate that the cap assembly 140 can open to allow a user to refill the contents of the mill. In some embodiments the cap clad 141 is not used. In such embodiments, the cap 142 may include an indicator.

The cap 142 along with cap gasket 143 work together to operatively close and provide access to the interior of the turn knob 110 and ultimately, through channels 435, access to chamber 520 (see, e.g., FIG. 8) for filling and refilling of the mill 100. The cap gasket 143 is coupled at a periphery of the cap 142 such that when the cap is in the closed position (see, e.g., FIG. 1) they work together to seal chamber 520 closed and help prevent the contents of the chamber 520 from falling out of the mill 100.

The illustrated cap 142 pivotally mounts to the turn knob 110 via a cap hinge 145, which interfaces with a cap hinge hole 112. In order to prevent over rotation of the cap 142, the turn knob can include a cap stopper 111. When in a closed or substantially horizontal position (see, e.g., FIG. 1) the cap 142 may at least partially rest on the upper surface of the cap stopper 111. When in an open or vertical position (see, e.g., FIG. 8) at least a portion of the cap 142 may contact a side surface of the cap stopper 111. Thus, the illustrated cap stopper 111 substantially inhibits the cap 142 from over rotating more than 90 degrees between open and closed positions. In some embodiments, the cap stopper 111 may inhibit rotation in different positions and to a different rotational range. In some embodiments, cap assembly 140 may include threads and screw into a similarly threaded turn knob. In still other embodiments, a person of ordinary skill in the art, based upon the description herein, may envision other ways of securing cap assembly 140 and turn knob 110.

The turn knob 110 may provide a comfortable surface for people to grip when operating the mill 100. Typically, a user would grasp the turn knob 110 with their dominant hand and the exterior body 120 with their non-dominant hand. Rotation of the turn knob 110 relative to the exterior body 120 causes the mill 100 to grind the spices or grains contained within the chamber 520. Linear or substantially linear translation of the turn knob 110 along the longitudinal axis changes the coarseness of the grind. The mill 100 may grind spices or grains at one or more grind settings. A coarse grind setting reduces the spices or grains to relatively large pieces; a fine grind setting reduces the spices or grains to relatively small pieces; and an intermediate grind setting reduces the spices or grains to intermediately sized pieces.

The turn knob 110 may also include an input member aperture 113. The input member aperture 113 accepts and couples the input member 413 of the cam driver 410 (see, e.g., FIGS. 3 and 4) to the turn knob 110. Through this connection of the input member aperture 113 and input member 413, the turn knob's 110 rotational and translational movements transfer from the turn knob 110 to the cam driver 410 and then to the grind shaft 220.

The accent ring 130 may have an internal diameter larger than the external diameter of the lower portion of the turn knob 110. This allows the accent ring to slide over the lower portion of the turn knob 110, thus covering the input member aperture 113 and input member 413 and providing a cleaner exterior appearance.

The accent ring 130 may also have an external diameter that is smaller than an internal diameter of an upper portion of the exterior body 120. This allows the accent ring 130 to translate or slide into and out of the exterior body 120 with the turn knob 110.

The exterior surface of the exterior body 120 provides a second comfortable surface for people to grip when operating the mill 100. Typically, in operation, a user would grab the exterior body 120 with their non-dominant hand and hold it steady while rotating or translating the turn knob 110 to grind spices or grains with the mill 100. The interior of the exterior body 120 also forms a portion of the chamber 520 for storing grains or spices and the lower portion of the exterior body 120 receives and holds a base capture 495, which in turn holds a grind ring frame 485 and a grind ring 490; see FIG. 5.

Figure 3:
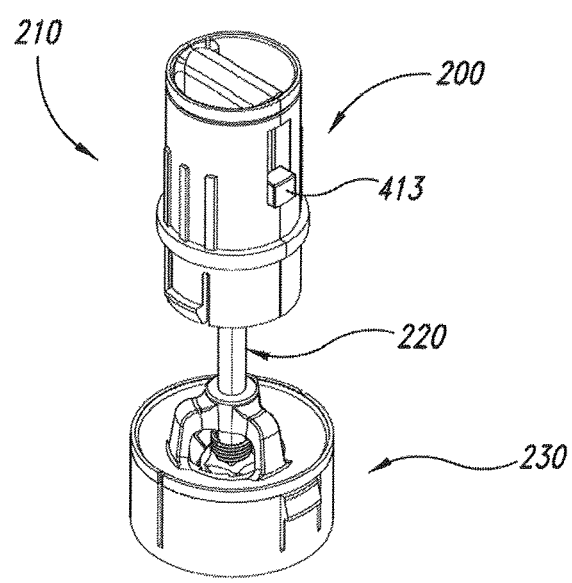
FIG. 3 is side, top isometric view of the internal assembly of the mill of FIG. 1.

FIG. 3 shows the interior assembly of the mill 100. The push-pull grinder assembly 200 is comprised of a control assembly 210 coupled though the grind shaft 220 to a grind assembly 230.

Figure 4:
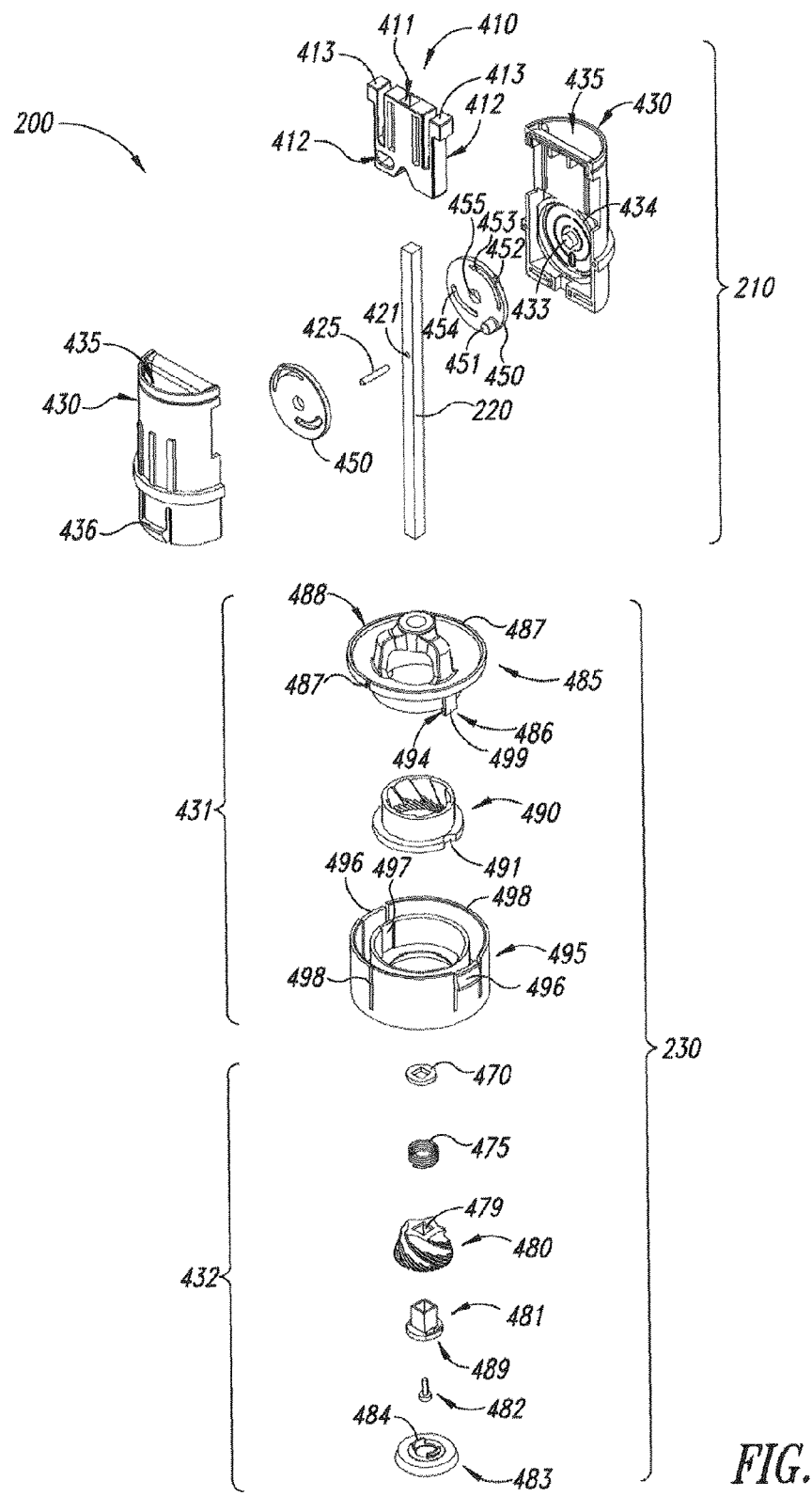
FIG. 4 is an exploded view of the internal assembly of the mill of FIG. 3.

FIG. 4 shows an exploded view of the interior assembly of the mill 100 including the control assembly 210 and grind assembly 230.

The control assembly 210 is comprised of a case that may be further comprised of two or more case halves 430 that house the cam driver 410, two cams 450, and a shaft pin 425. The control assembly may be coupled to the body by latches 436 that engage with a shoulder 125 (see, FIG. 8). The cam driver 410 is the main interface between the turn knob 110 and the internal operation of the mill 100. As discussed earlier, the input member aperture 113 of the turn knob 110 interfaces with the input member 413 of the cam driver 410. When the turn knob 110 rotates, the sidewalls of the aperture 113 contact the sidewalls of the input member 410, which causes the cam driver 410 to rotate with the turn knob 110. The shaft coupler 411 couples the cam driver 410 to the grind shaft 220 such that when the cam driver 410 rotates it also causes the grind shaft 220 to rotate. In some embodiments the shaft coupler 411 may be a shaft hole in which at least a portion of the shaft is inserted. A bushing 481 couples a rasp 480 to the grind shaft 220 such that the rasp 480 rotates with the grind shaft 220. Thus, when the turn knob 110 rotates, so does the rasp 480.

The cam driver 410 also controls the grind settings. The longitudinal translation of the turn knob 110 causes the upper and lower surfaces of the input member aperture 113 to contact the upper and lower surfaces of the input member 413. Thus, the translation force on the turn knob 110 acts on the cam driver 410, causing the cam driver 410 to translate longitudinally with the turn knob 110.

The cam driver 410 includes a cam pin slot 412 that accepts a cam pin 451 of a cam 450, the cam pin riding in the cam pin slot. The cam 450 includes a central hole 455 that rotatably couples the cam 450 to one of the case halves 430. When the cam driver 410 translates longitudinally, it imparts a tangential force on the cam pin 451, which causes the cam 450 to rotate about an axle 433 in each of the cam halves 430.

When the cam 450 rotates, the shaft pin 425 translates longitudinally up and down along the longitudinal axis, 'X.' The shaft pin hole 421 couples the shaft pin 425 to the grind shaft 220, thus the translation of the shaft pin also causes the translation of the grind shaft 220. As described in more detail below, the arrangement of the shaft pin 425, which rides in the shaft pin slot 454, and the radial variation along the length of the shaft pin slot within the cam 450 facilitates this longitudinal translation as the cam 450 rotates. In addition, the arrangement of the shaft pin slot 454 within the cam 450 may also facilitate a reduction in the grind shaft's 220 translation as compared to the translation of the turn knob 110. Thus, a relatively large longitudinal translation of the turn knob 110 may result in a relatively small longitudinal translation of the grind shaft 220 (and thus a small change to the grind size).

The cam 450 also includes a tension slot 453 and a detent pin 452. The illustrated tension slot 453 is a semi-circular slot that may be concentric to the radially outer surface of the cam 450; and the detent pin 452 may be located radially outward of a midpoint of the tension slot 453 and project from a radially outer surface of the cam 450. The arrangement of the tension slot 453 with the radially outer surface of the cam 450 may be such that the detent pin 452 and the radially outward surface of the cam 450 near the tension slot 453 may deform when a radially inward force acts on the detent pin 452. In this way, the web of material between the tension slot 453 and the radially outward surface of the cam 450 acts as a leaf spring and pushes the detent pin 452 into complementary detents 434 in the case half. In some embodiments a coil spring contained within a cam may act on a ball detent.

The arrangement of detent pin 452 and detents 434 allows the mill 100 to have two, three, four, or more finite grind settings and also assists in resisting changes in the grind setting that may be unintentional. For example, if the grains or spices being ground are particularly hard, a user might inadvertently push the turn knob 110 in towards the exterior body 120 while trying to rotate the turn knob 110. By applying force against the detent pin 452 and detents 434, the tension slots 453 resist rotation of the cam 450, which in turn resists longitudinal translation of the turn knob 110 and helps prevent inadvertent changes in the grind setting. In some embodiments, rather than using a single detent pin, multiple detent pins may be used to provide additional resistance to changing grind settings. In still other embodiments the outer radial surface of a cam may act directly on the detents 434 such that friction, including static friction, helps maintain the grind setting.

Figure 5:
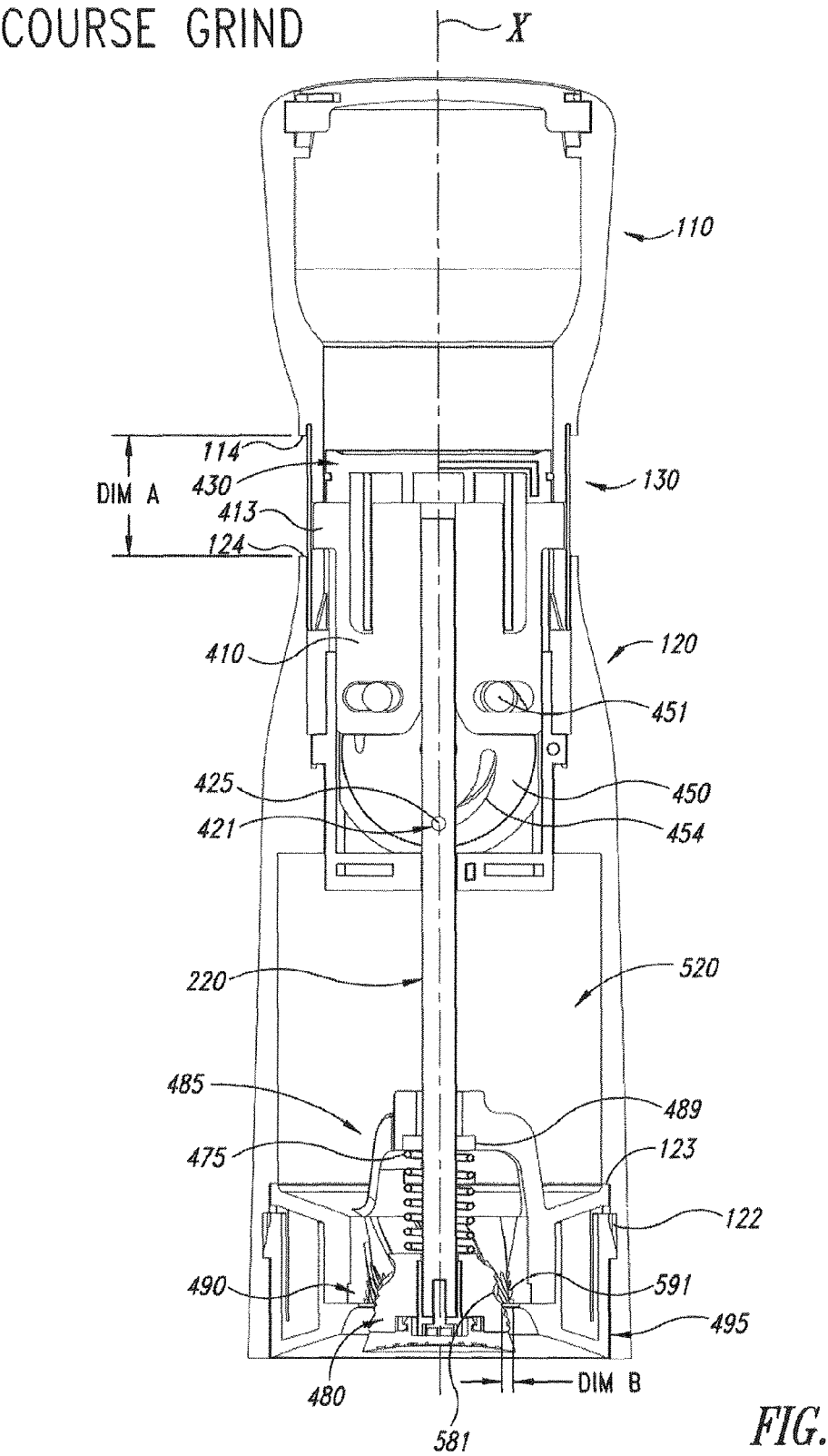
FIG. 5 is a cross-sectional view of the mill of FIG. 1 in a coarse grind configuration.

Referring now to FIGS. 4 and 5, the grind assembly 230 is comprised of a grind ring assembly 431 and a rasp assembly 432. The grind ring assembly 431 is comprised of the grind ring frame 485, the grind ring 490, and the base capture 495, while the rasp assembly is comprised of a rasp washer 470, a rasp spring 475, the rasp 480, the rasp bushing 481, a rasp screw 482, and a rasp cap 483.

The grind ring frame 485, grind ring 490, and base capture 495 use a series of alignment keys and key slots, along with a flange and a retention mechanism, to hold themselves in place and prevent their rotation relative to the exterior body 120 of the mill 100. The grind ring frame 485 sits in the interior of the exterior body 120 and uses keyways 487 that interface with keys (not shown) on the lower interior surface of the exterior body 120 to prevent the grind ring frame 485 from rotating. In addition, an upper portion 488 of the circumference of the grind ring frame 485 may rest on the flange 123 of the exterior body 120 (see FIG. 5). This arrangement may prevent the grind ring frame 485 from moving in a longitudinal direction by the upper portion 488 of the circumference of the grind ring frame 485, which may rest on the shoulder 123 of the exterior body 120 (see FIG. 5).

The grind ring frame 485 may also include a two-sided key 486. The two-sided key 486 may include a first side 499 configured to interface with keyway 497 of the base capture 495 and a second side 494 configured to interface with the keyway 491 of the grind ring 490. The base capture 495 may also include keyways 498 that interface with keys (not shown) on the lower interior surface of the exterior body 120 to prevent the base capture from rotating. In addition, the base capture 495 may include retention tabs 496 that interface with recess 122 (see FIG. 5) to couple the base capture 495 to the exterior body 120 and prevent the base capture 495 from moving in a longitudinal direction. Thus, the lower portion of the exterior body 120 retains the grind ring frame 485, grind ring 490, and base capture 495 and prevents them from moving laterally or rotating with respect to the exterior body 120.

The rasp assembly 432 is retained at the end of the grind shaft 220 between the grind ring frame 485 and the rasp screw 482 and rasp cap 483. The washer 470, spring 475, rasp 480, and rasp bushing 481 slide over the grind shaft 220. The rasp screw 482 couples the rasp bushing 481 to the grind shaft 220. The bushing, in turn, couples the rasp 480 to the grind shaft 220. The rasp 480 and washer 470 capture the spring 475 on the grind shaft 220. The grind ring frame 485 captures the washer 470 and prevents it from moving longitudinally up the grind shaft 220. The cross-sectional shape of the shaft hole 479 compliments that of the grind shaft 220 such that rotation of the grind shaft 220 causes the rasp 480 to rotate.

Finally, a retention tab 484 and recess 489 couple the rasp cap 483 and rasp bushing 481 together in an arrangement similar to that of the base capture 495 and exterior body 120 coupling.

Figure 6:
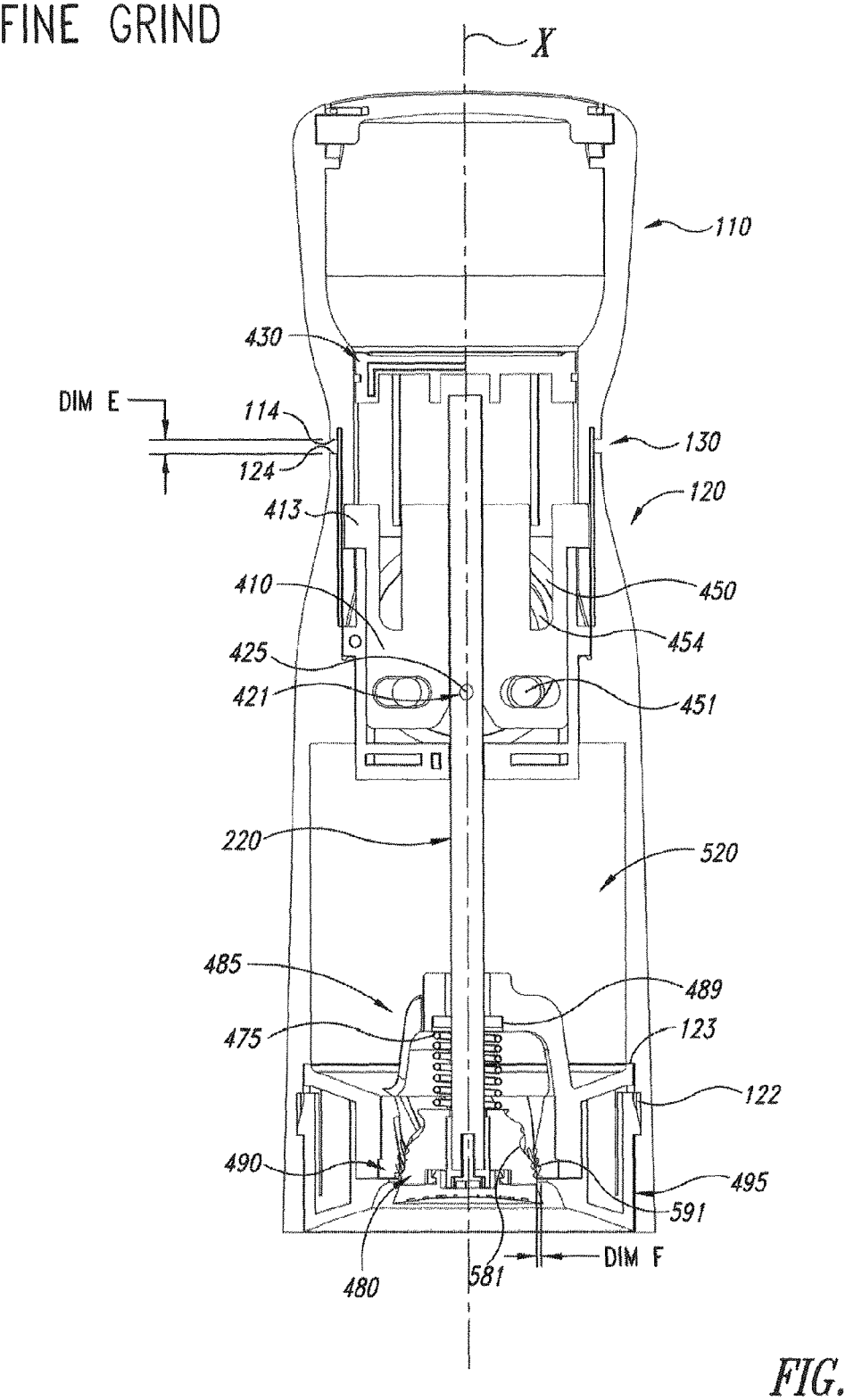
FIG. 6 is a cross-sectional view of the mill of FIG. 1 in a fine grind configuration.
Figure 7:
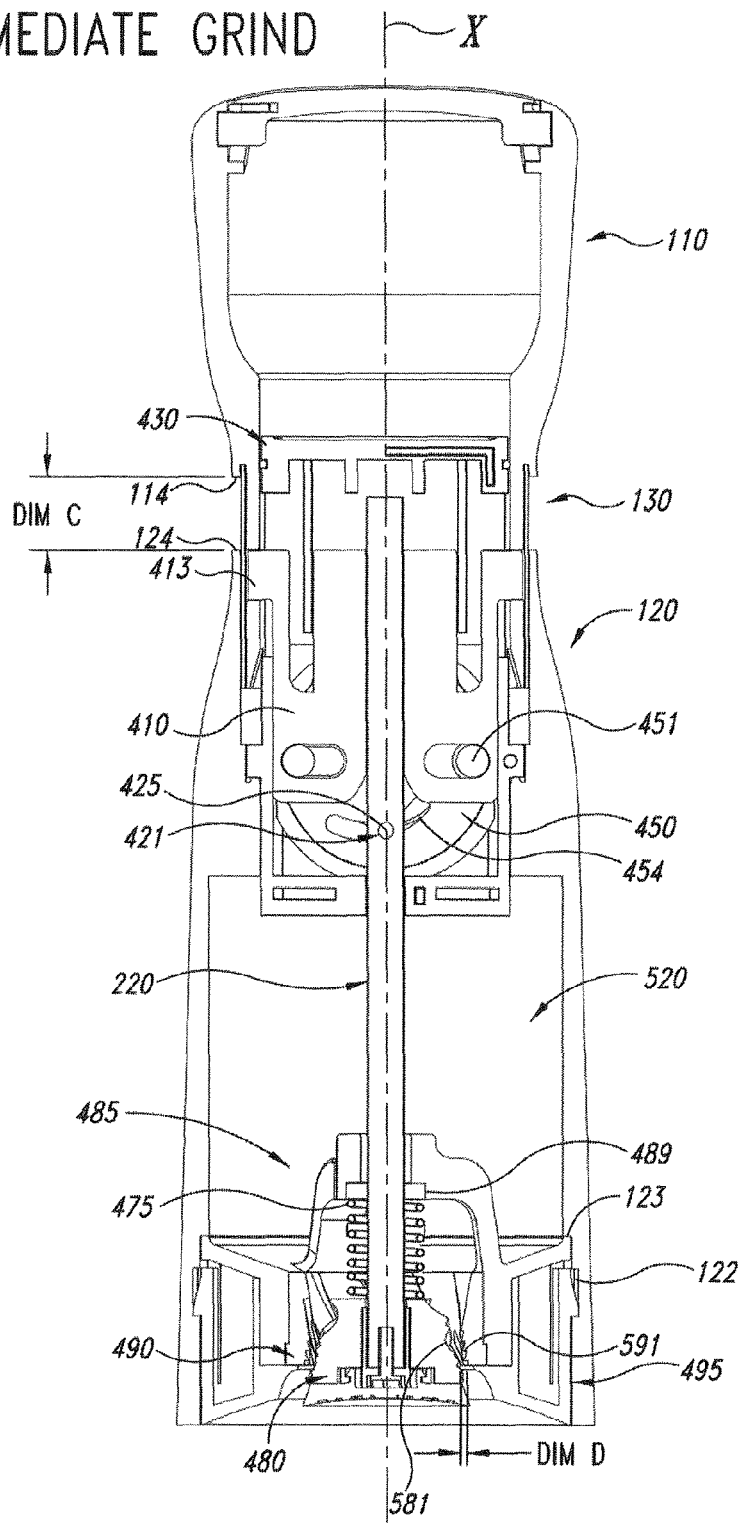
FIG. 7 is a cross-sectional view of the mill of FIG. 1 in an intermediate grind configuration.

FIGS. 5, 6, and 7 show three different grind settings and the relative arrangements of the various mill components at the three settings. FIG. 5 shows a cross section of the mill 100 of FIG. 1 along section line A-A in a coarse grind configuration.

In the coarse grind configuration the turn knob 110 is displaced longitudinally a distance A relative to the exterior body 120 of the mill 100. Although, for illustrative purposes, in the embodiment shown in FIGS. 5, 6, and 7, the distance A is measured between a shoulder 114 of the turn knob 110 and a shoulder 124 of the exterior body 120, no particular measurement locations are necessary.

The displacement or position of the turn knob 110 causes the longitudinal displacement of the cam driver 410, which in turn causes the rotational displacement of the cam 450 into the position shown in FIG. 5. In this position, cam pin 451 is in an upper position and the cam 450 is in its counterclockwise-most position, as viewed from the perspective shown in FIG. 5. When the cam 450 is in a counterclockwise-most position, the detent pin 452 is also in a counterclockwise-most detent 434 (not shown in FIG. 5). In some embodiments the cam and its associated pin may be in alternate locations in the course grind setting. For example, in an embodiment where the rotation of a cam is flipped, the course grind position may put a cam and its associated detent pin a in a clockwise-most position.

In the coarse grind configuration, the shaft pin 425 is at a radially outermost position of the cam pin slot 454. In the radially outermost position of the cam pin slot 454, the shaft pin 425 displaces the grind shaft 220 downward along the longitudinal axis X of the mill 100. The force imparted by the cam 450 through the cam pin slot 454 and the shaft pin 425 and then to the grind shaft 220 causes the grind shaft 220 to translate longitudinally in a downward direction. The translation of the grind shaft 220 in cooperation with the force imparted by the spring 475 onto the rasp 480 also causes the translation of the rasp 480. The rasp 480 is displaced away from the grind ring 490 such that a grinding surface 581 of the rasp 480 is displaced a distance B from a grinding surface 591 of the grind ring 490. Because of the relatively large distance B between the grinding surfaces 581 and 591, the grains or spices are ground or milled into relatively large pieces.

In the fine grind configuration shown in FIG. 6, the turn knob 110 is displaced longitudinally a distance E relative to the exterior body 120 of the mill 100. Although, for illustrative purposes, in the embodiment shown in FIG. 6, the distance E is measured between a shoulder 114 of the turn knob 110 and a shoulder 124 of the exterior body 120, no particular measurement locations are necessary. In some embodiments, when the mill is in the fine grind position, the shoulder 114 may contact shoulder 124 and therefore may have no longitudinal displacement relative to the exterior body 120. In some embodiments, this distance E in the fine grind position is zero or about zero.

In the fine grind position, the displacement or position of the turn knob 110 causes the longitudinal displacement or position of the cam driver 410, which in turn causes the rotational displacement of the cam 450 into the position shown in FIG. 6. In this position, cam pin 451 is in a lower position and the cam 450 is in its clockwise-most position, as viewed from the perspective shown in FIG. 6. When the cam 450 is in a clockwise-most position, the detent pin 452 is also in a clockwise-most detent 434. In some embodiments the cam and its associated pin may be in alternate locations in the fine grind position. For example, in an embodiment where the rotation of a cam is flipped, the fine grind position may put a cam and its associated detent pin a in a counterclockwise-most position.

In the fine grind configuration, the shaft pin 425 is at a radially innermost position of the cam pin slot 454. In the radially innermost position of the cam pin slot 454 (obscured by the cam driver 410), the shaft pin 425 displaces the grind shaft 220 upward along the longitudinal axis X of the mill 100. In some embodiments, the displacement of the grind shaft 220 in the fine grind position may be zero or about zero. The position of the cam 450, the cam pin slot 454 and the shaft pin 425, causes the grind shaft 220 to translate longitudinally to an upward most position, as shown in FIG. 6. The translation of the grind shaft 220 along with the force imparted by the spring 475 onto the rasp 480 also causes the translation of the rasp 480. In the fine grind position, the rasp 480 is displaced away from the grind ring 490 such that a grinding surface 581 of the rasp 480 is displaced a distance F from a grinding surface 591 of the grind ring 490. Because of the relatively small distance F between the grinding surfaces 581 and 591, the grains or spices are ground or milled into relatively small pieces.

In the intermediate grind configuration shown in FIG. 7, the turn knob 110 is displaced longitudinally a distance C relative to the exterior body 120 of the mill 100. Although, for illustrative purposes, in the embodiment shown in FIG. 7, the distance D is measured between a shoulder 114 of the turn knob 110 and a shoulder 124 of the exterior body 120, no particular measurement locations are necessary.

The displacement or position of the turn knob 110 causes the longitudinal displacement or position of the cam driver 410, which in turn causes the rotational displacement of the cam 450 into the position shown in FIG. 6. In this position, cam pin 451 is in an intermediate position and the cam 450 is also in an intermediate position. When the cam 450 is in an intermediate position, the detent pin 452 is in an intermediate detent 434, for example, a detent halfway between the fine grind detent position and the coarse grind detent position.

In the intermediate grind configuration, the shaft pin 425 is at a position in the cam pin slot 454 that is between the radially innermost and outermost positions. In a radially intermediate position of the cam pin slot 454, the shaft pin 425 positions the grind shaft 220 along the longitudinal axis X of the mill 100. The positions of the cam 450, the cam pin slot 454 and the shaft pin 425 cause the grind shaft 220 to translate longitudinally to an intermediate position, as shown in FIG. 6. The translation of the grind shaft 220 along with the force imparted by the spring 475 onto the rasp 480 also causes the translation of the rasp 480. In an intermediate grind position, the rasp 480 is displaced away from the grind ring 490 such that a grinding surface 581 of the rasp 480 is displaced a distance D from a grinding surface 591 of the grind ring 490. Because of the intermediate distance D between the grinding surfaces 581 and 591, the grains or spices are ground or milled into medium sized pieces.

The embodiments shown in FIGS. 5, 6, and 7, depict a mill with a fine grind setting wherein the turn knob 110 is minimally displaced, and a coarse grind setting wherein the turn knob 110 has maximum displacement. A person of ordinary skill in the art would understand that in some embodiments the grind settings and displacements may be reversed. Also, in the preceding descriptions certain arrangements of the cam driver 410, cam 450, detent pin 452, and other structures are described, but in some embodiments, one or more of these positions may be altered, and structures may be combined, removed, or replaced and the same or similar functionality may remain. For example, by pushing and pulling a portion of a mill relative to another portion of the mill, a distance between a surface of a rasp ring and a surface of a rasp may be changed, thus changing the grind coarseness setting of a mill.

Figure 8:
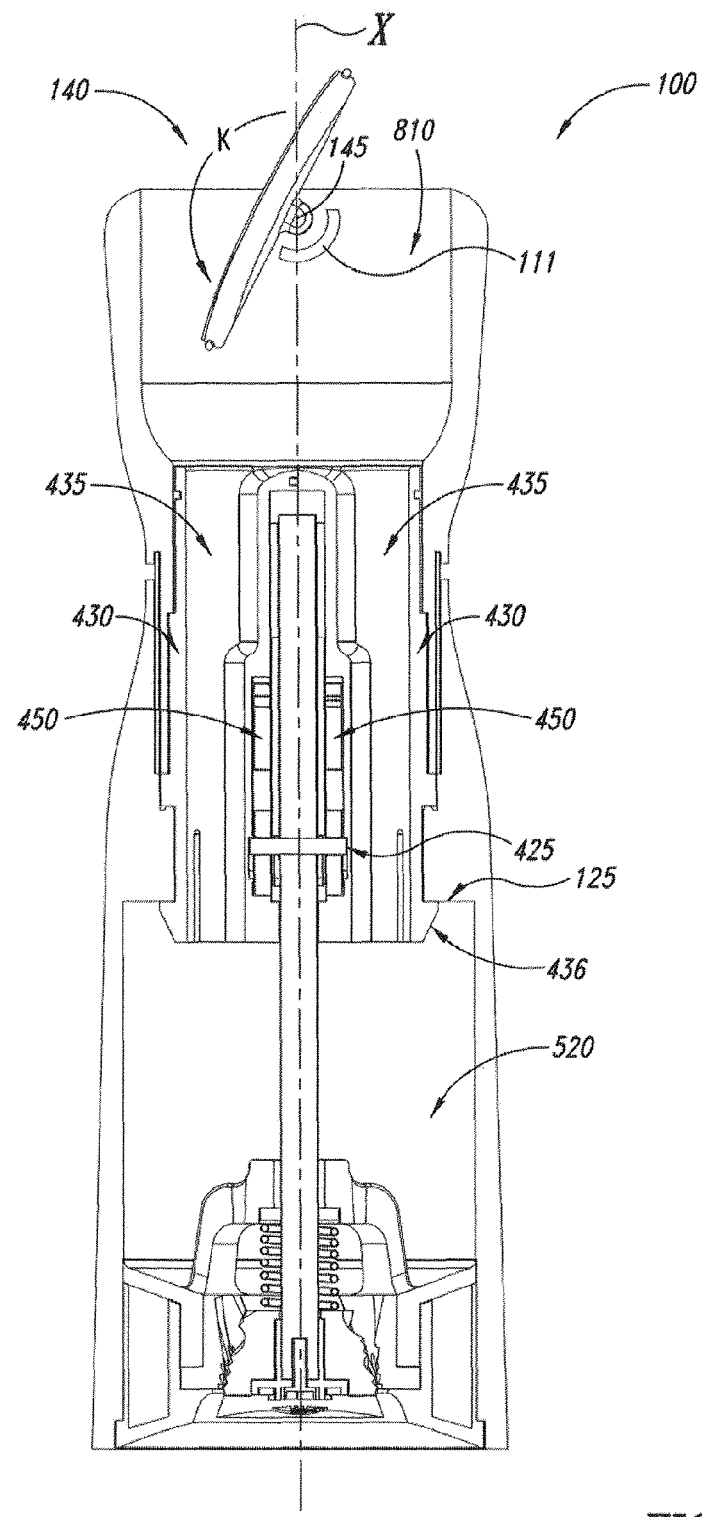
FIG. 8 is a cross-sectional view of the mill of FIG. 1 cap assembly in an open position.

FIG. 8 shows a cross-sectional view of a mill 100 with a cap assembly 140 in an open position. The cap assembly 140 rotates about cap hinge 145 in direction K from a closed position, as shown, for example, in FIG. 1, to an open position, as shown, for example, in FIG. 8. Opening the cap assembly 140 allows access to the interior of the mill 100 for filling or refilling the mill 100 with grains or spices. For example, when refilling the mill 100 a user may pour spices through the opening 810 in the turn knob. The spices may then flow through channels 435 in case halves 430 and into chamber 520, which holds the spices until they are ground.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A mill for grinding a spice or grain material, comprising:
 a body;
 a grinder ring coupled to the body and having a ring grinding surface;

a grind control assembly coupled to the body and including an input member;

a grind shaft coupled to the grind control assembly;

a turn knob having an axis of rotation and being rotatably coupled to the body to rotate with respect thereto about the axis of rotation, and slideably coupled to the grind control assembly via the input member for translation along a longitudinal axis between a first position and a second position;

a rasp having a rasp grinding surface and being coupled proximate to an end of the grind shaft;

the rasp being operatively positionable with respect to the grinder ring between at least a coarse spacing and a fine spacing;

wherein when the turn knob is in the first position the rasp grinding surface is at a coarse spacing from the ring grinding surface; and when the turn knob is in the second position, the rasp grinding surface is spaced at a fine spacing from the ring grinding surface;

wherein rotation of the turn knob relative to the body causes rotation of the rasp relative to the grinder ring and axial translation of the turn knob causes axial translation of the rasp relative to the grinder ring between at least the first and the second positions.

2. The mill of claim 1, wherein the axis of rotation and the longitudinal axis coincide with each other.

3. The mill of claim 1, further comprising:

a cap;

the turn knob further comprises an opening;

wherein the cap is rotatably secured to the turn knob such that the cap is operably rotatable between a closed position, in which the cap substantially covers the opening, and an open position, in which the cap does not substantially cover the opening.

4. The mill of claim 1, further comprising a grind ring frame and a base capture disposed in a lower portion of the body and operable to couple the grind ring to the body.

5. The mill of claim 1, further comprising a cam driver, wherein the cam driver couples the input member to the grind shaft.

6. The mill of claim 5, further comprising a first cam;

the first cam including a first cam pin, and the cam driver including a first cam pin slot;

the first cam and the cam driver arranged such that the first cam pin rides in the first cam pin slot.

7. The mill of claim 6, further comprising a shaft pin, the shaft pin coupling the grind shaft to the first cam.

8. The mill of claim 7, wherein the shaft pin rides in a shaft pin slot, the shaft pin slot being radially eccentric along its length and located within the first cam.

9. The mill of claim 8, further comprising a second cam;

the second cam including a second cam pin, and the cam driver including a second cam pin slot;

the second cam and the cam driver arranged such that the second cam pin rides in the second cam pin slot.

10. A grind control assembly for a mill, comprising:

a case;

an input member slidably coupled to the case;

a shaft; and a shaft coupler coupling the input member to the shaft such that substantially linear translation of the input member parallel to the shaft induces substantially linear translation of the shaft to adjust a grind coarseness of the mill.

11. The grind control assembly of claim 10, further comprising a cam driver, the cam driver including the shaft coupler that couples the input member to the shaft.

12. The grind control assembly of claim 11, further comprising a first cam;

the first cam including a first cam pin, and the cam driver including a first cam pin slot;

the first cam and the cam driver arranged such that the first cam pin rides in the first cam pin slot.

13. The grind control assembly of claim 12, further comprising a shaft pin, the shaft pin coupling the shaft to the first cam.

14. The grind control assembly of claim 13 wherein the shaft pin rides in a shaft pin slot, the shaft pin slot being radially eccentric along its length and located within the first cam.

15. The grind control assembly of claim 12, further comprising a second cam;

the second cam including a second cam pin, and the cam driver including a second cam pin slot;

the second cam and the cam driver arranged such that the second cam pin rides in the second cam pin slot.

16. A method for grinding a spice or grain material, comprising:

providing a mill comprised primarily of a turn knob, a mill body, and a grind assembly, the turn knob rotatably and slideably coupled to the mill body;

sliding the turn knob toward and away from the mill body to adjust a grind setting of the mill; and rotating the turn knob relative to the mill body to grind or mill the spice or grain material.

17. The method of claim 16 further comprising:

providing a cap pivotably coupled to an opening in the mill;

pivoting the cap and filling the mill with the spice or grain material.

* * * * *